July 4, 1961 C. CHALHOUB 2,991,433

ADJUSTABLE ATTENUATION CORRECTING NETWORKS

Filed June 4, 1959 3 Sheets-Sheet 1

INVENTOR
CHRISTIAN CHALHOUB
BY
Paul M. Craig, Jr.
ATTORNEY

July 4, 1961 C. CHALHOUB 2,991,433

ADJUSTABLE ATTENUATION CORRECTING NETWORKS

Filed June 4, 1959 3 Sheets-Sheet 2

INVENTOR
CHRISTIAN CHALHOUB
BY
Paul M. Craig, Jr.
ATTORNEY

INVENTOR
CHRISTIAN CHALHOUB
BY
Paul M. Craig, Jr.
ATTORNEY

United States Patent Office 2,991,433

Patented July 4, 1961

2,991,433

ADJUSTABLE ATTENUATION CORRECTING NETWORKS

Christian Chalhoub, Paris, France, assignor to Compagnie Industrielle des Telephones, Paris, France, a corporation of France Filed June 4, 1959, Ser. No. 818,107
Claims priority, application France Aug. 4, 1958
8 Claims. (Cl. 333—28)

In a pending application Ser. No. 771,566, filed November 3, 1958, now Patent No. 2,948,866, issued August 9, 1960, there has been described an adjustable attenuation correcting network designed so that its adjustment only affects the attenuation which it produces, in a certain frequency band, called "zone of correction," while said attenuation for the frequencies outside said frequency band remains substantially constant whatever may be the adjustment of the correcting network.

The result is that, by connecting in series two such correcting networks, the zones of correction of which are separate, we can obtain, for each of said zones, a correction of attenuation determined by the one of said two networks, which corresponds to said zone of correction.

The present invention has for its object a correcting device, which makes possible to obtain the same result by using only one correcting network instead of two.

The correcting network described in the pending application is constituted by a main T bridge four-terminal network, the characteristic impedance of which is always equal to a value R, and which comprises two horizontal branches each consisting of a resistance equal to R, a vertical branch consisting of the primary winding of a transformer, and a bridge branch consisting of a resistance R connected in parallel with the input circuit of a cut-all antimetric auxiliary four-terminal lattice network having a first pair of opposite branches constituted by resistances adjustable so that their product remain equal to $R_0^2$, and a second pair of opposite branches constituted by the input circuits of two filters of which the output circuits are connected to resistances $R_0$, the output circuit of said cut-all antimetric auxiliary four-terminal network being connected, through a resistance $R_0^2/R_1$, to the secondary winding of said above-mentioned transformer, the rato of which is equal to $R/R_0$, said filters being designed so that their composite attenuation is non-zero in the zone of correction, and is negligible outside this zone.

It is known that, when the composite attenuation of a four-terminal network is negligible, its echo attenuation is very high, so that its actual input impedance is very substantially equal to the impedance connected to its output terminals. It results that, in the correcting network according to the copending application, the fixed opposite branches of the cut-all antimetric auxiliary four-terminal lattice network, constituted by the input circuits of filters the output circuits of which are connected to impedances $R_0$, have, in the passing bands of said filters, the same impedance $R_0$, so that said four-terminal network is symmetrical and has a characteristic impedance $R_0$, and therefore its impedance seen from any one of its pairs of terminals is equal to said characteristic impedance, since the four-terminal network is a cut-all network.

The present invention will be described hereinafter with particular reference to the drawings, given merely by way of example, wherein.

Figure 1:
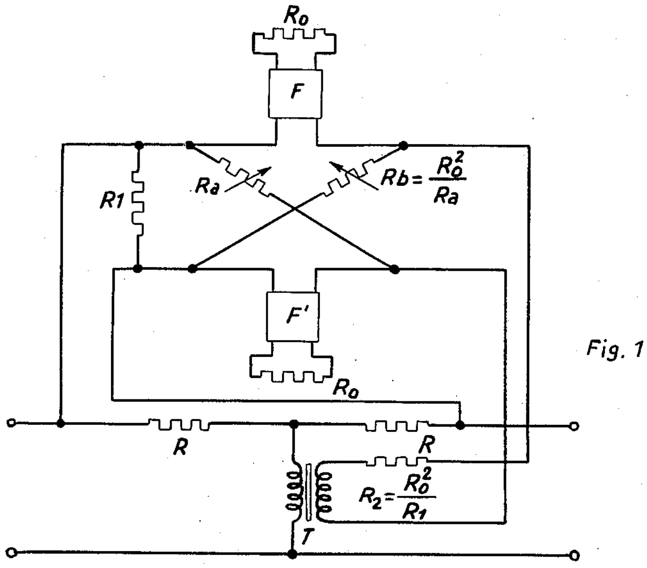
FIGURE 1 is an attenuating network of the type corresponding to the aforementioned copending application.
Figure 2:
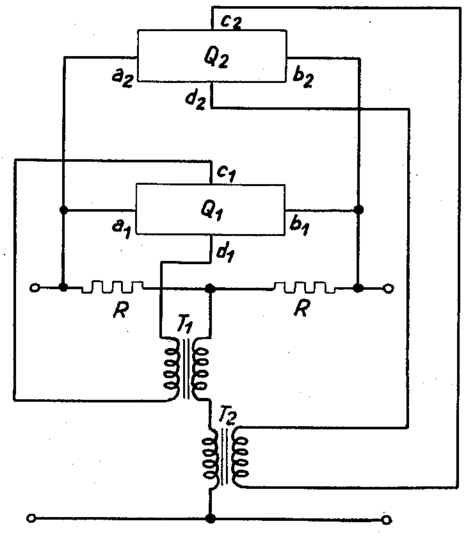
FIGURE 2 is a schematic illustration of a first embodiment of a double-bridge-T-type four-terminal network in which the input terminals of two bridging lattice networks are connected across the horizontal arms of the main T-type network and the output terminals are connected by transformer means to the vertical arm of the T-type network.

Consequently, if, in the device shown by FIGURE 1, which is the same as FIG. 2 of the copending application, we make $R_1=R_2=R_0$, we can substitute to the two resistances $R_1$ and $R_2$ the input circuits of a second cut-all four-terminal network, of a structure similar to that of the first one, and of which the filters have a composite attenuation negligible in the zone of correction, said substitution causing no modification of the attenuation of the network in the said zone. Inversely, the first cut-all auxiliary four-terminal network will have, across its terminals, a constant impedance equal to $R_0$ in the zone of correction corresponding to the attenuated band of the second cut-all auxiliary four-terminal network. The vertical branch of the main four-terminal network must be coupled to the two cut-all auxiliary four-terminal networks through two separate transformers.

The correcting network according to the invention, makes possible to obtain, in two zones of correction, variations of attenuation adjustable on both sides of a mean value which is the attenuation caused by the correcting network outside said zones. It has the advantage that, for the same maximum amplitude of these variations, the mean value of the attenuation is substantially lower than this which should be obtained by putting in series two separate networks.

The correcting network according to the invention is therefore a network, with constant impedance, and having two separate zones of correction.

This correcting network is characterized in this that it consists of a main double-bridge-T type four-terminal network, the two bridges consisting of the input circuits, placed in parallel, of two antimetric cut-all auxiliary four-terminal lattice networks of means characteristic impedance $R_0$, of which the output circuits are connected to the primary windings of two transformers, of which the secondary windings are arranged in series in the median branch of the T, said auxiliary four-terminal networks each comprising two opposite branches consisting of variable resistances of which the product tends to remain equal to $R_0^2$, and two other branches consisting of the input circuits of inverted filters of which the output terminals are respectively connected to resistances $R_0$, the filters of one of the four-terminal network being determined so as to have a composite attenuation which is non-zero in one of the domains of correction and negligible outside said domain, and the filters of the other four-terminal network having an attenuation which is non-zero in the other domain of correction and negligible outside that domain.

The attached FIG. 2 represents the diagram of a correcting network of this kind. The main four-terminal network comprises two horizontal branches each consisting of a resistance R, a bridge branch composed of the input circuits $a_1b_1$ and $a_2b_2$ connected in parallel, two auxiliary cut-all antimetric auxiliary four-terminal lattice networks $Q_1$ and $Q_2$ of characteristic impedance $R_0$, of which the output circuit $c_1d_1$ and $c_2d_2$ are respectively connected to the primary windings of two transformers $T_1$ and $T_2$ of transformation ratio $$k=\frac{R}{R_0}$$

and a vertical branch consisting of the series-connected secondary windings of said transformers.

Figure 3:
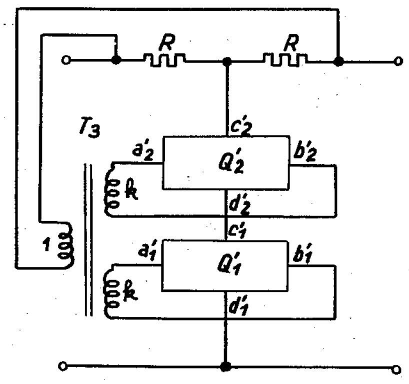
FIGURE 3 is a schematic diagram of a second embodiment of the invention wherein two lattice networks are coupled in bridging relationship to the horizontal arms of the T-type network by transformer means with the output terminals of the lattice networks connected in the vertical branch of the T-type network.

FIG. 3 represents a variant of the device of FIG. 2, which only comprises a single transformer. In this modification the vertical branch of the main four-terminal network consists of the output circuits $c'_1d'_1$ and $c'_2d'_2$ connected in series, the two four-terminal lattice networks $Q'_1$ and $Q'_2$ of which the input circuits $a'_1b'_1$ and $a'_2b'_2$ are respectively connected to the two secondary windings of a single transformer $T_3$, of ratio $k$, of which the secondary winding constitutes the "bridge" branch of the main four-terminal network. The two devices according to FIGS. 2 and 3 have identical attenuation and impedance characteristics, if the characteristic impedances of the four-terminal networks Q and Q' are such that $R_0'=k^2R_0$.

Figure 4:
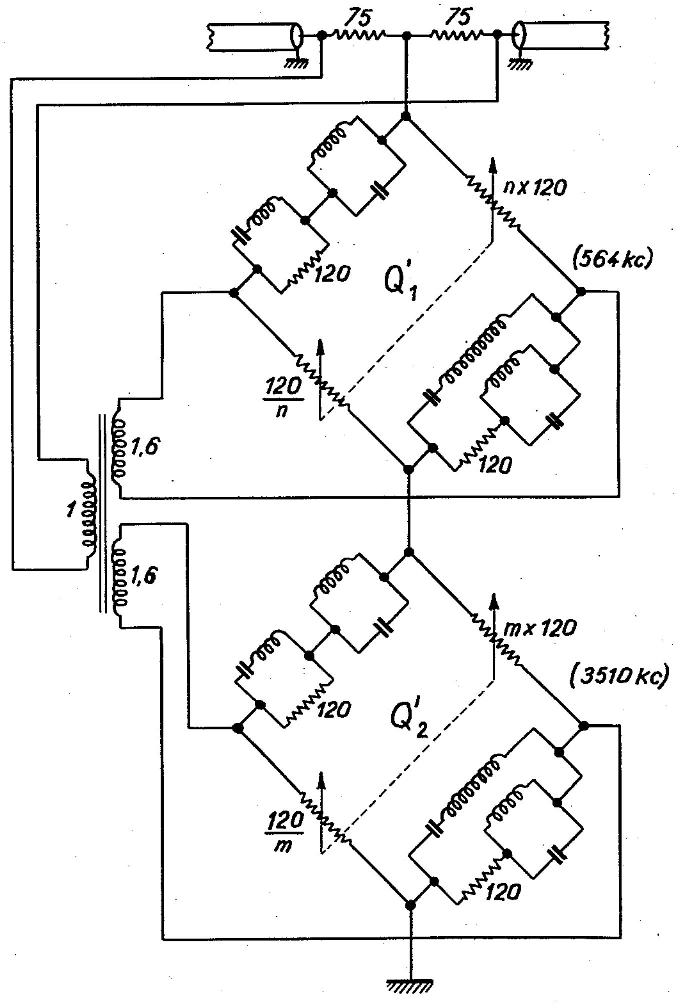
FIGURE 4 is a more detailed schematic diagram of the embodiment of FIGURE 3.

FIG. 4 represents a detailed embodiment of a correcting network according to the variant of FIG. 3. This network forms one of the elements of an assembly of correcting networks designed so as to obtain the equalisation of the attenuation of a section of coaxial cable, of impedance characteristic equal to 75 ohms, in a frequency band comprised between 60 kc./s. and 12 mc./s. The horizontal branches of the main four-terminal network consist of 75-ohm resistances, the transformer $T_3$ has a ratio of 1.6 and the two auxiliary four-terminal networks $Q_1'$ and $Q_2'$ of characteristic impedance equal to 120 ohms $$\left(\frac{120}{75}=1.6\right)$$

comprise two opposite branches consisting of two resistances which can be made to vary while maintaining the geometrical means of their values equal to 120 ohms; for this purpose one of the resistances of $Q'_1$ can assume any value $n\times 120$, the other resistance then having the value $120/n$, $n$ being any number; similarly the two resistances of $Q'_2$ can respectively assume the values $m\times 120$ and $120/m$. The two other opposite branches of $Q'_1$ and $Q'_2$ are composed, one of the input circuit of a half-T section and the other of the input circuit of a half-$\pi$ section, the output terminals of said half-sections being connected to 120-ohm resistances. The correcting network obtained in this way shows, for certain values of the elements of the half-sections, two domains of correction, in the vicinity of 564 kc./s and 3,510 kc./s, respectively.

Figure 5:
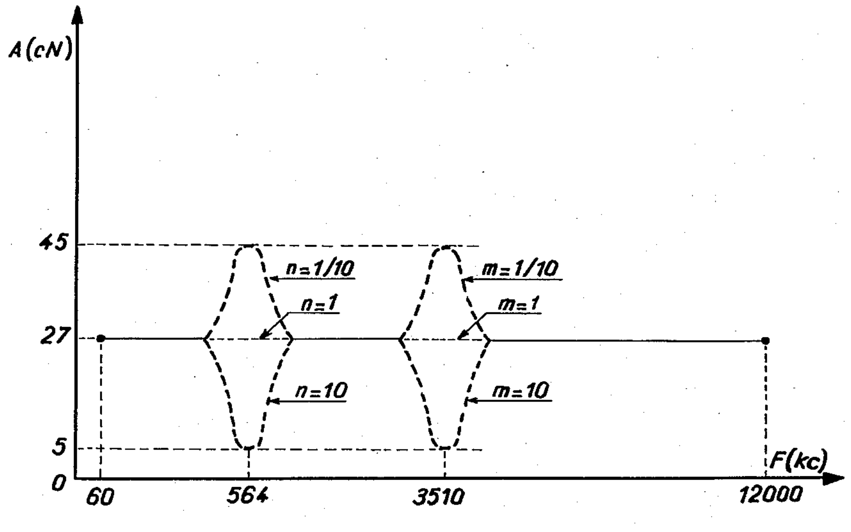
FIGURE 5 is a curve of attenuation versus frequency illustrating the two different bands of attenuation correction for the respective lattice networks in the overall correcting network according to the present invention.

FIG. 5 shows the way in which the attenuation A produced by the network, varies as a function of the frequency, in its two domains of correction when the resistances forming the branches of its four-terminal networks $Q_1$ and $Q_2$ are caused to vary.

If, in either of said four-terminal networks, the same value, 120 ohms, be given to the two resistances ($n$ or $m=1$), the attenuation A of the network is equal to the reference attenuation 27 centinepers, in the corresponding domain of correction.

If the resistances of either of the two four-terminal networks be adjusted so that $n=1/10$ or $m=1/10$, the attenuation A of the network for the central frequency of the corresponding domain of correction (564 kc./s. or 3,510 kc./s.) reaches 45 centinepers. If, on the other hand, $n=10$ or $m=10$ be taken, the coresponding attenuation A of the network is reduced to 5 centinepers.

More generally, it would be possible, in order to obtain $p$ "domains of correction" to constitute the "bridge" branch of the main quadripole according to FIG. 2 of the input circuits arranged in parallel, of $p$ auxiliary antimetric cut-all four-terminal lattice networks, of characteristic impedance $R_0$, of which the output circuits would be connected, via transformers, in the vertical branch of said main four-terminal network. However, the fact that the input circuit of each four-terminal network is then shunted by the impedances of the $p-1$ others, reduces the efficacy of the corrector, so that in practice, it is not advantageous to use more than three four-terminal networks.

I claim:

1. Adjustable attenuation-correcting network, having a constant characteristic impedance R, consisting of a main bridge-T four-terminal network comprising two horizontal branches each consisting of a resistance equal to R, characterized by the fact that, in order that the adjustment of said network controls its attenuation inside two separate bands of frequencies, called "zones of correction" and remains without effect outside said bands of frequencies, said main bridge-T four-terminal network comprises a vertical branch consisting of the primary windings, connected in series, of two transformers, and a bridge branch comprising the input circuits, connected in parallel, of two cut-all antimetric auxiliary four-terminal lattice networks, having a mean characteristic impedance $R_0$, and of which the output circuits are connected respectively to the secondary windings of said transformers, said auxiliary four-terminal lattice networks each comprising a first pair of opposite branches constituted by adjustable resistances which can be made to vary while maintaining their product equal to $R_0^2$, and a second pair of opposite branches each constituted by the input circuit of a filter of which the output circuit is connected to a resistance $R_0$, the filters of one of said cut-all antimetric auxiliary four-terminal networks being designed so as to have non-zero composite attenuation in one of the zones of correction and a negligible composite attenuation outside this zone, and the filters of the other of said cut-all antimetric auxiliary four-terminal networks being designed so as to have a non-zero composite attenuation in the other zone of correction and a negligible composite attenuation outside said zone.

2. An attenuation-correcting network consisting of a main T-type four-terminal network having a first circuit portion comprising two joined horizontal branches and a second circuit portion forming vertical branch connected to the junction of said horizontal branches, a correcting network means having first terminal means coupled in bridging relationship with respect to said horizontal branches and second terminal means coupled into said vertical branch, said correcting network means comprising two cut-all antimetric auxiliary four-terminal lattice networks, each lattice network having a characteristic impedance $R_0$, each lattice network comprising a first pair of opposite branches constituted by resistances the produce of which is equal to $R_0^2$ and a second pair of opposite branches each constituted by the input circuit of a filter of which the ouput circuit is connected to a resistance $R_0$, the filters of one of said cut-all antimetric auxiliary four-terminal networks having non-zero composite attenuation in a first frequency band of correction and a negligible composite attenuation outside this first frequency band, and the filters of the other of said cut-all antimetric auxiliary four-terminal networks having a non-zero composite attenuation in a second different frequency band of correction and a negligible composite attenuation for frequencies outside said second band, one of said terminal means including transformer means for coupling it to the respective circuit portion of said T-type four-terminal network.

3. An attenuation-correcting network according to claim 2, wherein the first pair of opposite branches of each lattice network comprise adjustable resistances which can be varied while their product is maintained equal to $R_0^2$.

4. An adjustable attenuation-correcting network according to claim 3, wherein each of said lattice networks has input terminals connected in bridging relationship to the horizontal branches of the main T-type four-terminal network and wherein each lattice network has a pair of output terminals coupled to said vertical branch of the main T-type four-terminal network by said transformer means.

5. An adjustable attenuation-correcting network according to claim 4, wherein said transformer means includes two transformers, one winding of each transformer being connected to the output terminals of a respective lattice network and the other windings of said transformers being connected in series in said vertical branch of the T-type four-terminal network.

6. An adjustable attenuation-correcting network according to claim 3, wherein each lattice network includes input terminals coupled in bridging relationship to the horizontal branches of said T-type four-terminal network by said transformer means, each lattice network including output terminals connected in said vertical branch of the T-type four-terminal network.

7. An adjustable attenuation-correcting network according to claim 6, wherein said transformer means includes primary winding means and secondary winding means, one of said winding means being connected in bridging relationship with respect to said horizontal branches of a T-type four-terminal network and the other winding means including two windings connected to the respective input terminals of said lattice networks.

8. An adjustable attenuation-correcting network according to claim 7, wherein the output terminals of said lattice networks are connected in series in said vertical branch of the T-type four-terminal network.

References Cited in the file of this patent

UNITED STATES PATENTS

| | | |
|---|---|---|
| 2,914,738 | Oswald | Nov. 24, 1959 |
| 2,948,866 | Oswald | Aug. 9, 1960 |

FOREIGN PATENTS

| | | |
|---|---|---|
| 793,165 | Great Britain | Apr. 9, 1958 |